US008445824B2

(12) United States Patent
Negley et al.

(10) Patent No.: US 8,445,824 B2
(45) Date of Patent: May 21, 2013

(54) LIGHTING DEVICE

(75) Inventors: Gerald H. Negley, Durham, NC (US); Antony Paul Van De Ven, Sai Kung (CN)

(73) Assignee: Cree, Inc., Durham, NC (US)

( * ) Notice: Subject to any disclaimer, the term of this patent is extended or adjusted under 35 U.S.C. 154(b) by 233 days.

(21) Appl. No.: 12/469,819

(22) Filed: May 21, 2009

(65) Prior Publication Data

US 2010/0102199 A1 Apr. 29, 2010

Related U.S. Application Data

(60) Provisional application No. 61/108,133, filed on Oct. 24, 2008.

(51) Int. Cl.
*G01J 1/20* (2006.01)

(52) U.S. Cl.
USPC ........ 250/201.1; 250/205; 250/216; 250/228; 315/149; 315/150; 315/151; 362/84; 362/232; 362/240; 362/327; 362/800

(58) Field of Classification Search
USPC .................... 315/149–159; 362/84, 294, 230, 362/232, 240, 327, 800; 250/201.1, 205, 250/216, 228
See application file for complete search history.

(56) References Cited

U.S. PATENT DOCUMENTS 3,541,504 A 11/1970 Bush
4,918,487 A 4/1990 Coulter, Jr.
5,631,190 A 5/1997 Negley
5,912,477 A 6/1999 Negley
6,600,175 B1 7/2003 Baretz et al.
6,945,672 B2 9/2005 Du et al.
7,001,047 B2 2/2006 Holder et al.
7,131,760 B2 11/2006 Mayer et al.
7,214,952 B2 5/2007 Klipstein et al.
7,246,921 B2 7/2007 Jacobson et al.
7,482,567 B2 * 1/2009 Hoelen et al. ................ 250/205

(Continued)

FOREIGN PATENT DOCUMENTS

CN 1784786 6/2006
CN 101027794 8/2007

(Continued)

OTHER PUBLICATIONS

Chinese Office Action (and translation provided by foreign counsel) from a corresponding Chinese patent application bearing a mailing date of Feb. 1, 2013, 12 pages.

*Primary Examiner* — Douglas W Owens
*Assistant Examiner* — Thai Pham
(74) *Attorney, Agent, or Firm* — Burr & Brown

(57) ABSTRACT

There is provided a lighting device, comprising at least one light emitter, at least one reflector and at least one sensor. The sensor is positioned within a region which receives direct light from the light emitter when the light emitter is emitting light. In some embodiments, the light emitter comprises one or more light emitting diode. In some embodiments, the sensor is positioned between the light emitter and a power supply. In some embodiments, the reflector comprises at least one opening, and light emitted by the light emitter passes through the opening to the sensor. In some embodiments, the sensor is sensitive to only some wavelengths of visible light. Some embodiments are back-reflecting lamps, and some are forward-reflecting lamps.

21 Claims, 3 Drawing Sheets

U.S. PATENT DOCUMENTS

| | | | | |
|---|---|---|---|---|
| 7,942,556 | B2 * | 5/2011 | Harbers et al. | 362/294 |
| 2002/0080622 | A1 * | 6/2002 | Pashley et al. | 362/555 |
| 2006/0087841 | A1 | 4/2006 | Chern et al. | |
| 2006/0237636 | A1 * | 10/2006 | Lyons et al. | 250/228 |
| 2007/0001177 | A1 | 1/2007 | Bruning et al. | |
| 2007/0045524 | A1 | 3/2007 | Rains, Jr. et al. | |
| 2007/0170447 | A1 | 7/2007 | Negley | |
| 2007/0171145 | A1 | 7/2007 | Coleman | |
| 2007/0236911 | A1 | 10/2007 | Negley | |
| 2007/0274063 | A1 | 11/2007 | Negley | |
| 2007/0274080 | A1 | 11/2007 | Negley | |
| 2007/0278934 | A1 | 12/2007 | Van de Ven | |
| 2007/0279440 | A1 | 12/2007 | Negley | |
| 2007/0280624 | A1 | 12/2007 | Negley | |
| 2008/0084685 | A1 | 4/2008 | Van de Ven | |
| 2008/0088248 | A1 | 4/2008 | Myers | |
| 2008/0089053 | A1 | 4/2008 | Negley | |
| 2008/0093530 | A1 * | 4/2008 | Hoelen et al. | 250/201.1 |
| 2008/0106887 | A1 * | 5/2008 | Salsbury et al. | 362/84 |
| 2008/0106895 | A1 | 5/2008 | Van de Ven | |
| 2008/0130298 | A1 | 6/2008 | Negley | |
| 2008/0304261 | A1 | 12/2008 | Van de Ven | |
| 2008/0309255 | A1 | 12/2008 | Myers | |
| 2008/0310158 | A1 * | 12/2008 | Harbers et al. | 362/240 |
| 2009/0108269 | A1 | 4/2009 | Negley | |
| 2009/0184666 | A1 | 7/2009 | Myers | |
| 2010/0294961 | A1 * | 11/2010 | Ashdown | 250/552 |

FOREIGN PATENT DOCUMENTS

| | | | |
|---|---|---|---|
| CN | 101167408 | | 4/2008 |
| CN | 101689588 | | 3/2010 |
| DE | 26 48 686 | A1 | 5/1978 |
| WO | 2009/107003 | A1 | 9/2009 |

* cited by examiner

LIGHTING DEVICE

CROSS-REFERENCE TO RELATED APPLICATION

This application claims the benefit of U.S. Provisional Patent Application No. 61/108,133, filed Oct. 24, 2008, the entirety of which is incorporated herein by reference.

FIELD OF THE INVENTIVE SUBJECT MATTER

The present inventive subject matter relates to lighting devices. More particularly, the present inventive subject matter relates to lighting devices comprising a light emitter, a reflector and a sensor.

BACKGROUND

A large proportion (some estimates are as high as twenty-five percent) of the electricity generated in the United States each year goes to lighting. Accordingly, there is an ongoing need to provide lighting which is more energy-efficient. It is well known that incandescent light bulbs are very energy-inefficient light emitters—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, efficacy (lm/W), and/or duration of service.

With regard to embodiments in which the light emitter comprises one or more solid state light emitter, in many instances, a plurality of solid state light emitters are provided which are of different colors which, when mixed, are perceived as the desired color for the output light (e.g., white or near-white). The intensity of light emitted by solid state light emitters (e.g., light emitting diodes which in many instances further comprise one or more luminescent materials), when supplied with a given current, can vary (e.g., depending on the ambient temperature and/or the age of the solid state light emitter). Because of such potential variance, such lighting devices sometimes are provided with one or more sensors which detect (1) the color of the light being emitted, and/or (2) the intensity of the light being emitted from one or more of the solid state light emitters, and/or (3) the intensity of light of one or more specific hues of color, whereby the current supplied to different solid state light emitters can be adjusted as necessary in order to maintain the color of the output light within the desired range of color.

In addition, there exist a wide variety of other devices which include one or more light emitters and one or more sensors.

BRIEF SUMMARY OF THE INVENTIVE SUBJECT MATTER

In many cases, however, readings obtained from sensors are inaccurate for any of a variety of reasons.

For example, in some cases, ambient light is received by the sensor(s) in addition to light from the light emitter(s), and the intensity of the ambient light as received by the sensor(s), relative to the intensity of the light from the light emitter(s), is sufficiently large to adversely affect the accuracy of the reading by the sensor(s) to a significant degree.

In other cases, the sensor(s) is sensitive to only some color hues, and so the sensor(s) senses the intensity of those color hues (e.g., the color(s) of those solid state light emitters which are most likely to decrease in intensity over time and/or with elevated temperature). In such cases, if an object (e.g., a white sheet of paper) is positioned close to the lighting device, the intensity of all color hues, including those to which the sensor (s) is sensitive will increase, thereby adversely affecting the accuracy of the reading by the sensor(s).

In many existing devices, sensors are mounted facing in the same direction that the light emitters output light. In accordance with the present inventive subject matter, there are provided back-reflecting and forward-reflecting lamps which comprise one or more sensors which directly view the light from the light emitter(s), e.g., which face toward the light emitter(s). As a result, the amplitude of the direct light is so great that it will swamp out any reflected or ambient light component. In some embodiments of the present inventive subject matter, as discussed below, the sensor is recessed in the reflector (or in one of the reflectors) to limit any variation in the amount of light sensed. In addition, in some embodiments, the sensor(s) is/are placed directly below the light emitter in the reflector, and a significant portion of the light that is output directly below the light emitter would otherwise be reflected back into the light emitter (if the sensor(s) according to the present inventive subject matter were not placed there), thereby reducing or minimizing the amount of light that is lost as a result of the placement of the sensor(s).

Other techniques for sensing changes in light output of solid state emitters include providing separate or reference emitters and a sensor that measures the light output of these emitters. These reference emitters are placed so as to be isolated from ambient light such that they typically do not contribute to the light output of the lighting device. Additional techniques for sensing the light output of a solid state lighting device include measuring ambient light and light output of the lighting device separately and then compensating the measured light output of the solid state emitters based on the measured ambient light.

According to a first aspect of the present inventive subject matter, there is provided a lighting device, comprising:

at least one light emitter;

at least one reflector, the reflector being positioned to receive light from the light emitter and reflect the light to exit the lighting device; and at least one sensor, the sensor being positioned within a region which receives direct light from the light emitter when the light emitter is emitting light.

In some embodiments according to the first aspect of the present inventive subject matter, the sensor is positioned on or within the reflector.

In some embodiments according to the first aspect of the present inventive subject matter, the sensor is positioned within a conical region bounded by lines which each define an angle of ten degrees or less (and in some embodiments, five degrees or less) relative to an axis of direct light emitted by the light emitter when the light emitter is emitting light.

In some embodiments according to the first aspect of the present inventive subject matter, the lighting device further comprises at least one power supply, and the sensor is positioned between the light emitter and the power supply.

In some embodiments according to the first aspect of the present inventive subject matter, the reflector comprises at least one opening, the sensor being positioned opposite the opening with respect to the light emitter, such that when the light emitter is emitting light, a portion of light emitted by the light emitter passes through the opening to the sensor.

According to a second aspect of the present inventive subject matter, there is provided a lighting device, comprising:

at least one light emitter;

at least one reflector, the reflector being positioned to receive light from the light emitter and reflect the light to exit the lighting device; and at least one sensor, the sensor being positioned within a region which receives direct light and/or reflected light from the light emitter when the light emitter is emitting light, wherein:

(1) the sensor is positioned directly next to the light emitter, and/or (2) at least 75% of the reflected light from the light emitter received by the sensor would not exit the lighting device if the sensor were not present.

In some embodiments according to the present inventive subject matter, the at least one light emitter comprises at least one solid state light emitter. In some of such embodiments, the at least one solid state light emitter comprises a light emitting diode, while in others, the at least one solid state light emitter comprises a plurality of light emitting diodes.

In some embodiments according to the present inventive subject matter, the sensor is sensitive to visible light of all wavelengths, while in other embodiments, the sensor is sensitive to only some wavelengths of visible light.

In some embodiments according to the present inventive subject matter, when the light emitter is emitting light, at least 90% of light emitted by the light emitter is reflected only once by the reflector.

In some embodiments according to the present inventive subject matter, when the light emitter is emitting light, at least 10% of light emitted by the light emitter is reflected at least twice by the reflector.

In some embodiments according to the present inventive subject matter, the light emitter comprises a plurality of reflectors, and when the light emitter is emitting light, at least 10% of light emitted by the light emitter is reflected by at least two of the plurality of reflectors.

In some embodiments according to the present inventive subject matter, the light emitter comprises a plurality of reflectors, and when the light emitter is emitting light, at least 70% of light emitted by the light emitter is reflected by at least two of the plurality of reflectors. In some of such embodiments, at least 50% of light emitted by the light emitter exits the lighting device in a direction which defines an angle of not greater than 90 degrees relative to an axis of direct light emitted by the light emitter.

In some embodiments according to the present inventive subject matter, the reflector comprises at least one opening, and the sensor is positioned such that a portion of light emitted by the light emitter travels directly from the light emitter, through the opening and to the sensor, and substantially no ambient light passes through the opening and to the sensor, i.e., some direct light passes from the light emitter, through the opening and to the sensor, and substantially no direct light passes from outside the lighting device (i.e., ambient light), through the opening and to the sensor. In some of such embodiments, the opening is of a small enough size, relative to the light emitter, and/or the sensor is spaced far enough from the opening, that some direct light passes from the light emitter, through the opening and to the sensor, and substantially no direct light passes from outside the lighting device (i.e., ambient light), through the opening and to the sensor, i.e., it is possible for some ambient light to enter the lighting device, reflect off the reflector (or off one or more of the reflectors), then reflect off the light emitter, and then pass through the opening to the sensor, but no ambient light shines onto the sensor as direct light from outside the lighting device.

The inventive subject matter may be more fully understood with reference to the accompanying drawings and the following detailed description of the inventive subject matter.

BRIEF DESCRIPTION OF THE DRAWING FIGURES

Figure 4:
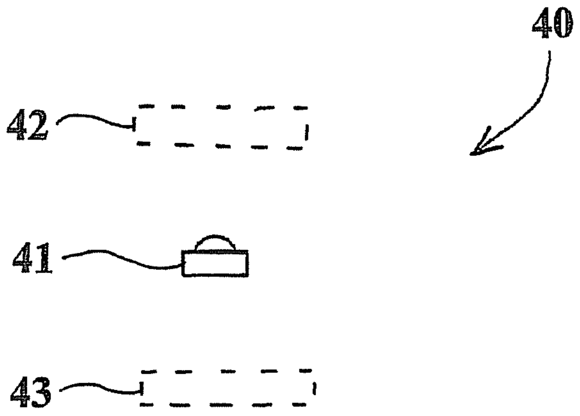

FIG. 4 schematically depicts a lighting device that comprises a light emitter and two reflectors.

DETAILED DESCRIPTION OF THE INVENTIVE SUBJECT MATTER

The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "lower" or "bottom" and "upper" or "top," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "lighting device", as used herein, is not limited, except that it is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or backlighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosed space (uniformly or non-uniformly).

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As noted above, in accordance with the present inventive subject matter, there is provided a lighting device, comprising at least one light emitter, at least one reflector and at least one sensor.

The light emitter (or light emitters) in the lighting devices according to the present inventive subject matter can be any desired light emitter, a variety of which are well known and readily available to persons skilled in the art. Representative examples of light emitters include incandescent lights, fluorescent lamps, LEDs (inorganic or organic, including polymer light emitting diodes (PLEDs)) with or without luminescent materials, laser diodes, thin film electroluminescent devices, light emitting polymers (LEPs), halogen lamps, high intensity discharge lamps, electron-stimulated luminescence lamps, etc. Some embodiments of the lighting devices according to the present inventive subject matter include two or more light emitters. In such lighting devices, the respective light emitters can be similar to one another, different from one another, or any combination (i.e., there can be a plurality of light emitters of one type, or one or more light emitters of each of two or more types).

The lighting devices according to the present inventive subject matter can comprise any desired number of light emitters. For example, a lighting device according to the present inventive subject matter can include a single light emitting diode, fifty or more light emitting diodes, 1000 or more light emitting diodes, fifty or more light emitting diodes and two incandescent lights, 100 light emitting diodes and one fluorescent light, etc.

Persons of skill in the art are familiar with a wide variety of reflectors for use in lighting devices, and any of such reflectors can be employed in the devices according to the present inventive subject matter.

The reflector (or reflectors) in a lighting device according to the present inventive subject matter can be of any desired shape, and in many embodiments, the reflector (or reflectors)

is/are shaped so as to allow a high percentage of light directed toward the reflector(s) to exit from the lighting device. A wide variety of shapes for a reflector in a lighting device, or for a combination of plural reflectors in a lighting device, are well known, and any such reflectors or combinations of reflectors can be employed in the lighting devices according to the present inventive subject matter. The reflector, or the plurality of reflectors, can be shaped and oriented relative to the one or more light sources such that some or all of the light from the light source will reflect once before exiting the lighting device, will reflect twice before exiting the lighting device (i.e., once off a first reflector and once off a second reflector, or twice of the same reflector), or will reflect any other number of times before exiting the light device. This includes situations where some light from a light source reflects a first number of times (e.g., only once) before exiting the lighting device and other light from the light source reflects a second number of times (e.g., twice) before exiting the lighting device (and situations where any number of different parts of light from the light source is reflected different numbers of times).

The reflector (or reflectors) can be made of any desired material or materials (e.g., aluminum, silver or titanium, or any desired material which is coated with aluminum, silver or titanium or dielectric stack of materials forming a Bragg Reflector), and in cases where a lighting device according to the present inventive subject matter comprises more than one reflector, the respective reflectors can be made of the same material, or any reflector(s) can be made of different materials. Persons of skill in the art are familiar with a wide variety of materials for making reflectors. As is well known, a reflector used in the lighting devices according to the present inventive subject matter can be made of a single material (which may be polished or otherwise treated in manners well known in the art) or can comprise multiple materials (e.g., it can comprise a support made of one material, the support being coated with a reflective material).

Representative examples of suitable arrangements of reflectors include back-reflectors, in which an axis of light from at least one light emitter is reflected at least 90 degrees, e.g., close to or equal to 180 degrees, and forward reflectors, in which an axis of light from at least one light emitter is reflected at least 90 degrees (e.g., close to or equal to 180 degrees) a first time, and is then reflected again by at least 90 degrees (e.g., close to or equal to 180 degrees) a second time (whereby, in some cases, the axis of light is again traveling in substantially the same direction it was before being reflected for the first time).

Representative examples of suitable reflectors (and arrangements thereof) are described in many patents, e.g., U.S. Pat. Nos. 6,945,672, 7,001,047, 7,131,760, 7,214,952 and 7,246,921 (the entireties of which are hereby incorporated by reference), each of which describes, inter alia, back-reflectors.

The reflector can include cusps and/or facets, as known in the art. In some embodiments, the reflector has an M-shaped contour, as also known in the art. In some embodiments, the reflector collects the light emitted from the LEDs and reflects the light so that it does not strike the light emitter(s) and/or structure on which the light emitter(s) is/are mounted (e.g., a bridge as described in connection with embodiments discussed below), e.g., in some embodiments, the reflector is contoured and the cusps or facets are shaped such that light striking the reflector behind the bridge is directed to either side of the bridge. See, e.g., U.S. Pat. No. 7,131,760. Furthermore, in some embodiments, the reflector is contoured and the cusps or facets are shaped such that light striking the reflector not directly behind the bridge is directed to the center of the light beam's pattern and to fill in other areas of the beam that may be deficient. Each cusp or facet can be individually aimed so that light reflected from the reflector(s) forms a desired beam pattern while avoiding striking the bridge or the light emitter.

Persons of skill in the art are familiar with a wide variety of sensors, and any of such sensors can be employed in the devices and methods of the present inventive subject matter. Among these well known sensors are sensors which are sensitive to only a portion of visible light. For example, the sensor can be a unique and inexpensive sensor (GaP:N LED) that views the entire light flux but is only (optically) sensitive to one or more of a plurality of LEDs. For instance, in one specific example, the sensor can be sensitive to only the light emitted by LEDs which in combination produce BSY light (defined below), and the sensor can provide feedback to one or more red LEDs for color consistency as the LEDs age (and light output decreases). By using a sensor that monitors output selectively (by color), the output of one color can be selectively controlled to maintain the proper ratios of outputs and thereby maintain the color temperature of the device. This type of sensor is excited by only light having wavelengths within a particular range, e.g., a range which excludes red light (see, e.g., U.S. Patent Application No. 60/943,910, filed on Jun. 14, 2007, entitled "DEVICES AND METHODS FOR POWER CONVERSION FOR LIGHTING DEVICES WHICH INCLUDE SOLID STATE LIGHT EMITTERS" (inventor: Peter Jay Myers; and U.S. patent application Ser. No. 12/117,280, filed May 8, 2008, the entireties of which are hereby incorporated by reference). "BSY" light is defined in the present application (and in the applications mentioned above in this paragraph) as light having color coordinates on a 1931 CIE Chromaticity Diagram which define a point within an area enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38)

As noted above, in some embodiments according to the present inventive subject matter, the sensor (or at least one of the sensors) is positioned within a region which receives direct light from the light emitter (or at least one of the light emitters) when the light emitter is emitting light. In other words, in such embodiments, light travels directly from the light emitter to the sensor without being reflected or absorbed and re-emitted.

As noted above, in some embodiments, the sensor (or at least one of the sensors) is positioned on or within the reflector (or at least one of the reflectors) (e.g., within a bore extending into the reflector).

As noted above, in some embodiments, the sensor (or at least one of the sensors) is positioned within a conical region bounded by lines which each define an angle of ten degrees or less (and in some embodiments, five degrees or less) relative to an axis of direct light emitted by the light emitter (or at least one of the light emitters) when the light emitter is emitting light. In other words, in such embodiments, a line extending from the light emitter to the sensor would define an angle, relative to an axis of the light emitted by the light emitter, of not more than ten degrees (and in some embodiments, not more than five degrees).

As noted above, in some embodiments according to a second aspect of the present inventive subject matter, the sensor is positioned within a region which receives direct light and/or reflected light from the light emitter when the light emitter is emitting light, wherein: (1) the sensor is positioned directly next to the light emitter, and/or (2) at least 75% of the reflected light from the light emitter received by the sensor would not exit the lighting device if the sensor were not present. In such embodiments, "directly next to the light emitter" means, e.g., on the same circuit board or spaced by a distance not larger than one tenth (and in some cases not larger than one twentieth, or 2%, or 1%) of a largest dimension of the opening of the reflector.

As noted above, in some embodiments, the lighting device further comprises at least one power supply, and the sensor (or at least one of the sensors) is positioned between the light emitter and the power supply. In other words, in such embodiments, a line connecting the light emitter and the power supply would pass through the sensor.

As noted above, in some embodiments, the reflector (or at least one of the reflectors) comprises at least one opening, the sensor (or at least one of the sensors) being positioned opposite the opening with respect to the light emitter (or at least one of the light emitters), such that when the light emitter is emitting light, a portion of light emitted by the light emitter passes through the opening to the sensor. In such embodiments, the opening can extend completely through the reflector or only partway through the reflector.

As noted above, in some embodiments, when the light emitter (or at least one of the light emitters) is emitting light, at least 90% of light emitted by the light emitter is reflected only once by the reflector (or at least one of a plurality of reflectors). Representative examples of such embodiments include lamps with back-reflectors (i.e., "back-reflecting lamps"), as discussed above.

As noted above, in some embodiments, when the light emitter (or at least one of the light emitters) is emitting light, at least 10% of light emitted by the light emitter is reflected at least twice by the reflector (or one of the reflectors). A representative example of such an embodiment includes a back-reflecting lamp with a reflector which has plural regions, in which some of the light from the light emitter is reflected once, while other portions of the light from the light emitter are reflected plural times, and some or all of the reflected light exits the lighting device in a direction which differs by greater than 90 degrees, e.g., close to or equal to 180 degrees, from the direction in which it is emitted from the light emitter.

As noted above, in some embodiments, the lighting device comprises a plurality of reflectors, and when the light emitter (or at least one of the light emitters) is emitting light, at least 10% of light emitted by the light emitter is reflected by at least two of the plurality of reflectors. A representative example of such an embodiment includes a back-reflecting lamp with plural reflectors, in which some of the light from the light emitter is reflected by one of the reflectors, while other portions of the light from the light emitter are reflected by more than one of the reflectors, and some or all of the reflected light exits the lighting device in a direction which differs by greater than 90 degrees, e.g., close to or equal to 180 degrees, from the direction in which it is emitted from the light emitter.

As noted above, in some embodiments, the lighting device comprises a plurality of reflectors, and when the light emitter is emitting light, at least 70% of light emitted by the light emitter is reflected by at least two of the plurality of reflectors. A representative example of such an embodiment includes a forward-reflecting lamp, in which an axis of light from at least one light emitter is reflected at least 90 degrees (e.g., close to or equal to 180 degrees) by a first reflector (or plurality of reflectors), and is then reflected again by at least 90 degrees (e.g., close to or equal to 180 degrees) a second time (whereby, in some cases, the axis of light is again traveling in substantially the same direction it was before being reflected for the first time) by a second reflector (or plurality of reflectors). FIG. 4 schematically depicts a lighting device 40 that comprises a light emitter 41 and two reflectors 42 and 43.

As indicated above, some embodiments according to the present inventive subject matter comprise one or more solid state light emitters. Any desired solid state light emitter or emitters can be employed in accordance with the present inventive subject matter. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well known in the art (and therefore it is not necessary to describe in detail such devices, and/or the materials out of which such devices are made).

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode. Any of such devices can be used as solid state light emitters according to the present inventive subject matter.

Light emitting diodes are semiconductor devices that convert electrical current into light. A wide variety of light emitting diodes are used in increasingly diverse fields for an ever-expanding range of purposes.

As is well known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

Many light emitters include one or more luminescent materials which can be used to provide a desired spectrum of light and/or to provide a desired perceived color of output light (e.g., white). The advantage of providing a wider spectrum of visible wavelengths to provide increased CRI (e.g., Ra) is well known, and the ability to predict the perceived color of output light from a lighting device which includes light emitters which output two or more respective colors of light is also well known, e.g., with the assistance of the CIE color charts.

A wide variety of luminescent materials (also known as lumiphors or luminophoric media, e.g., as disclosed in U.S. Pat. No. 6,600,175, the entirety of which is hereby incorporated by reference) are well known and available to persons of skill in the art. For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Inclusion of luminescent materials in LED devices has been accomplished in a variety of ways, one representative way being by adding the luminescent materials to a clear or transparent encapsulant material (e.g., epoxy-based, silicone-based, glass-based or metal oxide-based material) as discussed above, for example by a blending or coating process.

For example, one representative example of a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. The first resin portion can be obtained by filling the cup reflector with a resin material and curing it after the light emitting diode chip has been mounted onto the bottom of the cup reflector and then has had its cathode and anode electrodes electrically connected to the leads by way of wires. A luminescent material can be dispersed in the first resin portion so as to be excited with the light A that has been emitted from the light emitting diode chip, the excited luminescent material produces fluorescence ("light B") that has a longer wavelength than the light A, a portion of the light A is transmitted through the first resin portion including the luminescent material, and as a result, light C, as a mixture of the light A and light B, is used as illumination.

Representative examples of suitable solid state light emitters, including suitable light emitting diodes, luminescent materials, encapsulants, etc., are described in:

U.S. Patent Application No. 60/753,138, filed on Dec. 22, 2005, entitled "LIGHTING DEVICE" (inventor: Gerald H. Negley) and U.S. patent application Ser. No. 11/614,180, filed Dec. 21, 2006, the entireties of which are hereby incorporated by reference;

U.S. Patent Application No. 60/794,379, filed on Apr. 24, 2006, entitled "SHIFTING SPECTRAL CONTENT IN LEDS BY SPATIALLY SEPARATING LUMIPHOR FILMS" (inventors: Gerald H. Negley and Antony Paul van de Ven) and U.S. patent application Ser. No. 11/624,811, filed Jan. 19, 2007, the entireties of which are hereby incorporated by reference;

U.S. Patent Application No. 60/808,702, filed on May 26, 2006, entitled "LIGHTING DEVICE" (inventors: Gerald H. Negley and Antony Paul van de Ven); and U.S. patent application Ser. No. 11/751,982, filed May 22, 2007, the entireties of which are hereby incorporated by reference;

U.S. Patent Application No. 60/808,925, filed on May 26, 2006, entitled "SOLID STATE LIGHT EMITTING DEVICE AND METHOD OF MAKING SAME" (inventors: Gerald H. Negley and Neal Hunter) and U.S. patent application Ser. No. 11/753,103, filed May 24, 2007, the entireties of which are hereby incorporated by reference;

U.S. Patent Application No. 60/802,697, filed on May 23, 2006, entitled "LIGHTING DEVICE AND METHOD OF MAKING" (inventor: Gerald H. Negley) and U.S. patent application Ser. No. 11/751,990, filed May 22. 2007, the entireties of which are hereby incorporated by reference;

U.S. Patent Application No. 60/793,524, filed on Apr. 20, 2006, entitled "LIGHTING DEVICE AND LIGHTING METHOD" (inventors: Gerald H. Negley and Antony Paul van de Ven); and U.S. patent application Ser. No. 11/736,761, filed Apr. 18, 2007, the entireties of which are hereby incorporated by reference;

U.S. Patent Application No. 60/857,305, filed on Nov. 7, 2006, entitled "LIGHTING DEVICE AND LIGHTING METHOD" (inventors: Antony Paul van de Ven and Gerald H. Negley) and U.S. patent application Ser. No. 11/936,163, filed Nov. 7, 2007, the entireties of which are hereby incorporated by reference;

U.S. Patent Application No. 60/839,453, filed on Aug. 23, 2006, entitled "LIGHTING DEVICE AND LIGHTING METHOD" (inventors: Antony Paul van de Ven and Gerald H. Negley); and U.S. patent application Ser. No. 11/843,243, filed Aug. 22, 2007, the entireties of which are hereby incorporated by reference;

U.S. Patent Application No. 60/851,230, filed on Oct. 12, 2006, entitled "LIGHTING DEVICE AND METHOD OF MAKING SAME" (inventor: Gerald H. Negley); and U.S. patent application Ser. No. 11/870,679, filed Oct. 11, 2007, the entireties of which are hereby incorporated by reference;

U.S. Patent Application No. 60/916,608, filed on May 8, 2007, entitled "LIGHTING DEVICE AND LIGHTING METHOD" (inventors: Antony Paul van de Ven and Gerald H. Negley), and U.S. patent application Ser. No. 12/117,148, filed May 8, 2008, the entireties of which are hereby incorporated by reference; and U.S. patent application Ser. No. 12/017,676, filed on Jan. 22, 2008, entitled "ILLUMINATION DEVICE HAVING ONE OR MORE LUMIPHORS, AND METHODS OF FABRICATING SAME" (inventors: Gerald H. Negley and Antony Paul van de Ven) , U.S. Patent Application No. 60/982,900, filed on Oct. 26, 2007 (inventors: Gerald H. Negley and Antony Paul van de Ven) , the entirety of which is hereby incorporated by reference.

The lighting devices of the present inventive subject matter can be supplied with electricity in any desired manner. Skilled artisans are familiar with a wide variety of power supplying apparatuses, and any such apparatuses can be employed in connection with the present inventive subject matter. The lighting devices of the present inventive subject matter can be electrically connected (or selectively connected) to any desired power source, persons of skill in the art being familiar with a variety of such power sources.

Representative examples of apparatuses for supplying electricity to lighting devices and power supplies for lighting devices, all of which are suitable for the lighting devices of the present inventive subject matter, are described in:

U.S. Patent Application No. 60/809,959, filed on Jun. 1, 2006, entitled "LIGHTING DEVICE WITH COOLING" (inventors: Thomas G. Coleman, Gerald H. Negley and Antony Paul van de Ven) and U.S. patent application Ser. No. 11/626,483, filed Jan. 24, 2007, the entireties of which are hereby incorporated by reference;

U.S. Patent Application No. 60/809,595, filed on May 31, 2006, entitled "LIGHTING DEVICE AND METHOD OF LIGHTING" (inventor: Gerald H. Negley); and U.S. patent application Ser. No. 11/755,162, filed May 30, 2007, the entireties of which are hereby incorporated by reference;

U.S. Patent Application No. 60/844,325, filed on Sep. 13, 2006, entitled "BOOST/FLYBACK POWER SUPPLY TOPOLOGY WITH LOW SIDE MOSFET CURRENT CONTROL" (inventor: Peter Jay Myers); and U.S. patent application Ser. No. 11/854,744, filed Sep. 13, 2007, entitled "CIRCUITRY FOR SUPPLYING ELECTRICAL POWER TO LOADS", the entireties of which are hereby incorporated by reference;

U.S. Patent Application No. 60/943,910, filed on Jun. 14, 2007, entitled "DEVICES AND METHODS FOR POWER CONVERSION FOR LIGHTING DEVICES WHICH INCLUDE SOLID STATE LIGHT EMITTERS" (inventor: Peter Jay Myers); and U.S. patent application Ser. No. 12/117,280, filed May 8, 2008, the entireties of which are hereby incorporated by reference; and U.S. Patent Application No. 61/022,886, filed on Jan. 23, 2008, entitled "FREQUENCY CONVERTED DIMMING SIGNAL GENERATION" (inventors: Peter Jay Myers, Michael Harris and Terry Given); and U.S. Patent Application No. 61/039,926, filed Mar. 27, 2008, the entireties of which are hereby incorporated by reference.

In some embodiments according to the present inventive subject matter, the lighting device is a self-ballasted device. For example, in some embodiments, the lighting device can be directly connected to AC current (e.g., by being plugged into a wall receptacle, by being screwed into an Edison socket, by being hard-wired into a circuit, etc.). Representative examples of self-ballasted devices are described in U.S. Patent Application No. 60/861,824, filed on Nov. 30, 2006 entitled "SELF-BALLASTED SOLID STATE LIGHTING DEVICES" (inventors: Gerald H. Negley, Antony Paul van de Ven, Wai Kwan Chan, Paul Kenneth Pickard and Peter Jay Myers); U.S. Patent Application No. 60/916,664, filed May 8, 2007, and U.S. patent application Ser. No. 11/947,392, filed on Nov. 29, 2007, the entireties of which are hereby incorporated by reference.

The lighting devices of the present inventive subject matter can be arranged and mounted in any desired manner, and can be mounted on any desired housing or fixture. Skilled artisans are familiar with a wide variety of arrangements, mounting schemes, housings and fixtures, and any such arrangements, schemes, housings and fixtures can be employed in connection with the present inventive subject matter.

In addition, one or more scattering elements (e.g., layers) can optionally be included in the lighting devices according to this aspect of the present inventive subject matter. The scattering element can be included in a lumiphor, and/or a separate scattering element can be provided. A wide variety of separate scattering elements and combined luminescent and scattering elements are well known to those of skill in the art, and any such elements can be employed in the lighting devices of the present inventive subject matter.

The devices according to the present inventive subject matter can further comprise secondary optics to further change the projected nature of the emitted light. Such secondary optics are well known to those skilled in the art, and so they do not need to be described in detail herein—any such secondary optics can, if desired, be employed.

Embodiments in accordance with the present inventive subject matter are described herein with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

Figure 1:
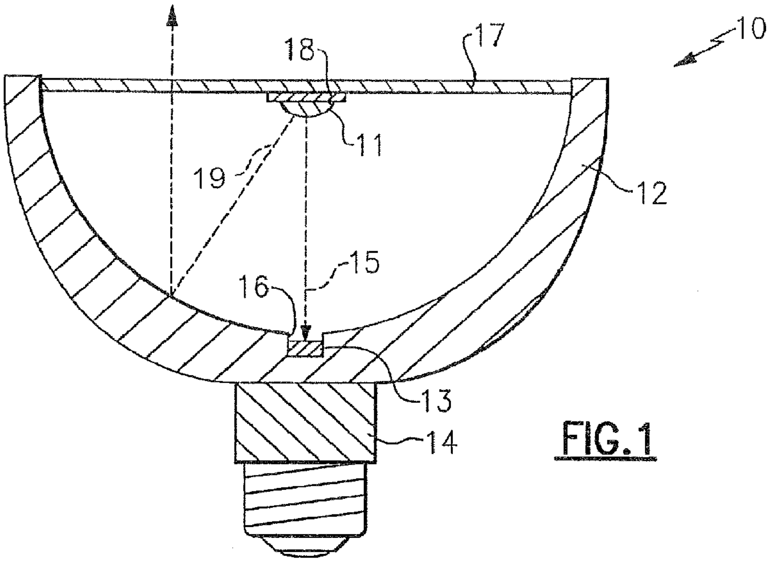
FIG. 1 is a cross-sectional view of a first embodiment of a lighting device according to the present inventive subject matter.
Figure 2:
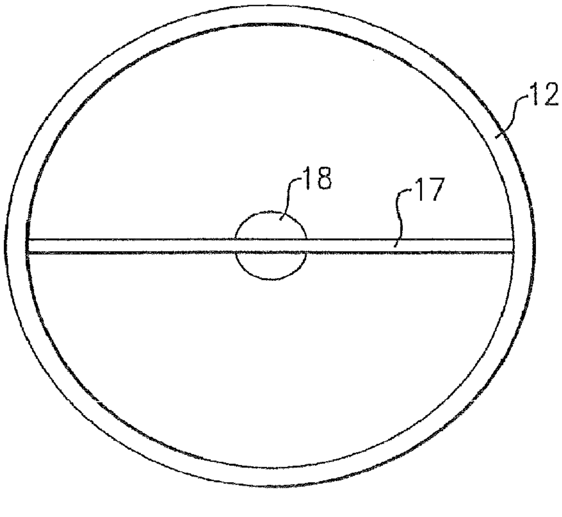
FIG. 2 is a top view of the lighting device depicted in FIG. 1.

FIGS. 1 and 2 depict a first embodiment of a lighting device according to the present inventive subject matter. Referring to FIG. 1, the lighting device 10 comprises a light emitter 11, a reflector 12, a sensor 13 and a power supply 14. The sensor 13 is positioned within a region which receives direct light from the light emitter when the light emitter is emitting light.

In this embodiment, the light emitter 11 comprises a plurality of solid state light emitters, including (1) a plurality of LEDs which each comprise a light emitting diode which emits blue light and luminescent material which absorbs a portion of the blue light and emits greenish-yellow light, and (2) a plurality of LEDs which emit red light.

The sensor 13 is positioned in an opening 16 in the reflector 12 to receive light from the LEDs in the light emitter 11. This embodiment further exemplifies the feature described above in which the sensor 13 is positioned within the reflector 12, within a conical region bounded by lines which each define an angle of about five degrees relative to the axis 15 of direct light emitted by the light emitter 11 when the light emitter 11 is emitting light. The sensor 13 is also positioned between the light emitter 11 and the power supply 14.

The reflector 12 comprises an opening 16, and the sensor 13 is positioned opposite the opening 16 with respect to the light emitter 11, such that when the light emitter 11 is emitting light, a portion of light emitted by the light emitter 11 passes through the opening 16 to the sensor 13.

The upper edge of the reflector 12 is generally circular, and the reflector 12 is generally parabolic. In alternative embodiments, the upper edge of the reflector can take other shapes, such as square, rectangular or other configurations, and the overall shape of the reflector 12 can be of any desired configuration.

The reflector 12 is positioned to receive light 19 from the light emitter 11 and reflect the light 19 to exit the lighting device.

In particular embodiments, such as this one, the sensor is sensitive to only some wavelengths of visible light, including the wavelengths of light emitted by the light emitting diodes which emit blue light and the luminescent material, but not the light emitting diodes which emit red light.

Referring to FIG. 2, the lighting device 10 further includes a bridge 17 and a circuit board 18. The bridge 17 spans an opening defined by the upper edge of the reflector 12. The bridge 17 and the reflector 12 can be made from one piece, or the bridge 17 can be a separate piece that is attached to the reflector 12. In this embodiment, the bridge 17 substantially bisects the opening defined by the upper edge of the reflector 12. In some embodiments, the width of the bridge 17 is minimized in order to minimize the amount of light that contacts the bridge 17 and/or needs to be directed around the bridge 17. The bridge 17 is depicted as spanning the opening defined by the upper edge of the reflector 12, but it can instead cantilever over the opening. Alternatively, the bridge 17 could be eliminated entirely and the light source held in place by a transparent cover or lens over the reflector 12, with conductive traces or other wiring to the light source.

The light emitter is mounted on the circuit board 18, and the circuit board 18 is attached to the bridge 17 on a surface substantially facing the reflector 12. Other arrangements for mounting the light emitter to the bridge may also be used. For example, the light emitter may be mounted directly to the bridge or to a separate central mounting plate attached to the bridge.

Optionally, the lighting device 10 can further include a circular lens which covers over the reflector 12 (i.e., which would cover the view shown in FIG. 2). Persons of skill in the art are familiar with a wide variety of lenses which would be suitable for use in the lighting devices according to the present inventive subject matter, and any of such lens covers can be used. Such lenses can be clear or colored, and can, if desired, include optical features.

Figure 3:
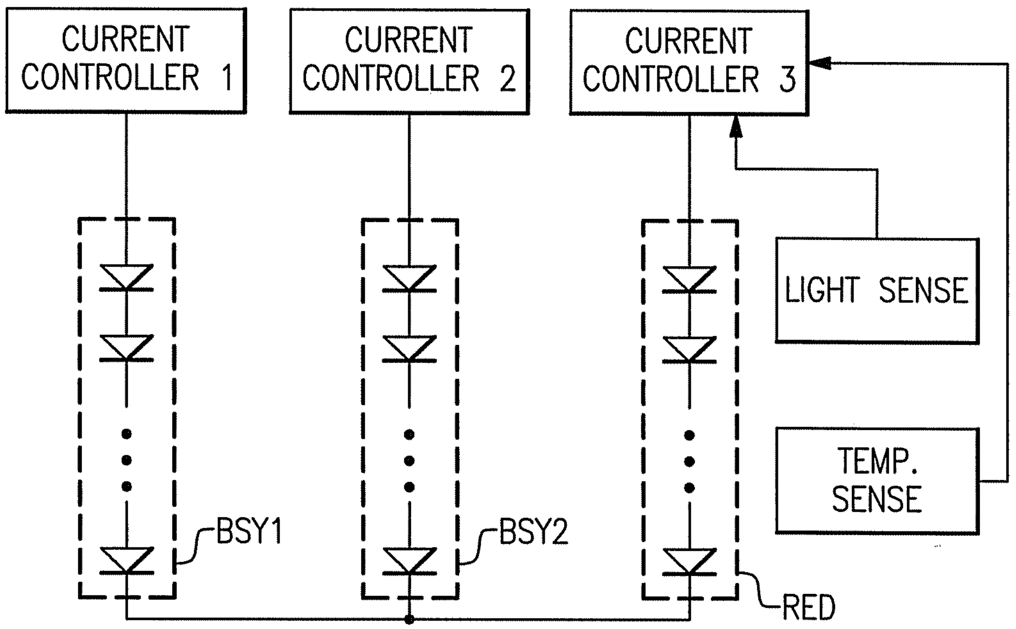
FIG. 3 illustrates a circuit utilizing a light sensor according to the present inventive subject matter.

FIG. 3 illustrates a circuit utilizing a light sensor according to the present inventive subject matter. The circuit shown in FIG. 3 also includes a temperature sensor. The circuit shown in FIG. 3 further includes three current controllers, a first to control current supplied to a first string of BSY LEDs, a second to control current supplied to a second string of BSY LEDs, and a third to control current supplied to a string of red LEDs (i.e., LEDs which emit red light). FIG. 3 illustrates three strings of LEDs, but any number of strings of LEDs may be utilized, as desired. The outputs from the temperature sensor and the light sensor affect the current supplied to the red LEDs. Additional details regarding the circuit depicted in FIG. 3 are described in U.S. Patent Application No. 60/943,910, filed on Jun. 14, 2007, and U.S. patent application Ser. No. 12/117,280 (filed May 8, 2008), above incorporated by reference in their entireties.

In operation, light from the light emitter is directed toward the reflector 12 and the sensor 13. The light from the light emitter is also reflected by the reflector 12 so as to exit the lighting device 10. Some of the light from the light emitter is received by the sensor 13 and converted to an electrical signal that may be used by the power supply to control the light output of the light emitter.

By placing the sensor 13 in a direct line of sight with the light emitter, the sensor 13 will receive a greater portion of light from the light source than light that is directed into the lighting device from outside the lighting device (i.e. ambient or reflected light). The ratio of ambient or reflected light to direct light received by the sensor 13 may be so low that the ambient and reflected light does not make a significant contribution to the signal generated by the sensor 13. In some embodiments, the amount of ambient or reflected light is such a small percentage of the light received by the sensor 13 that variations in the output of the sensor 13 from variations in the ambient or reflected light are below a detection threshold of the power supply. In other embodiments, the amount of ambient or reflected light is such a small percentage of the light received by the sensor 13 that variations in the output of the sensor 13 from variations in the ambient or reflected light that variations in the output of the power supply based on the variations in the output of the sensor 13 are not perceptible by a person viewing the lighting device and/or the output of the light from the lighting device.

Additionally, by recessing the sensor 13 in a hole in the reflector 12, the sensor may be shielded from light directly entering the lighting device from outside the lighting device (i.e., the sensor is not directly viewable from outside the lighting device). In such a case, the only light other than light directly from the light emitter that reaches the sensor 13 is light that is reflected. With each reflection likely resulting in a loss of light, the amount of light external to the device that reaches the sensor may be further reduced. The sidewalls of the hole in which the sensor is placed may also be non-reflective to further reduce the reflected light that reaches the sensor 13. Furthermore, recessing the sensor 13 does not adversely affect the light received directly from the light emitter because the sensor 13 is in a direct line of sight to the light emitter.

In some embodiments, the sensor 13 is placed substantially beneath the light emitter. Placing the sensor 13 beneath the light emitter may result in the sensor 13 receiving light that would otherwise be reflected back into the light emitter by the reflector 12. Thus, placing the sensor 13 beneath the light emitter may reduce or otherwise minimize light loss as a result of the use of the sensor 13 as the light received by the sensor 13 may not otherwise have exited the device even if the sensor 13 were not provided.

In embodiments according to the second aspect of the present inventive subject matter, at least one of the one or more sensors can be positioned on the same circuit board on which the light emitter is positioned, and/or it/they can be positioned in some location (e.g., on a bridge, on a heat transfer structure, on a housing, or on the reflector) where at least 75% of the reflected light from the light emitter received by the sensor would not exit the lighting device if the sensor were not present (i.e., at least 75% of the light would have been blocked anyway).

Furthermore, while certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the lighting devices described herein can be integrated. Any structural part of the lighting devices described herein can be provided in two or more parts (which are held together, if necessary). Similarly, any two or more functions can be conducted simultaneously, and/or any function can be conducted in a series of steps.

The invention claimed is:

1. A lighting device, comprising:

at least one light emitter;

at least one reflector; and at least one sensor, said sensor within a region which receives direct light from said light emitter when said light emitter is emitting light, said sensor on or within said reflector, said reflector comprising at least one curved region, prior to exiting said lighting device, light that exits said lighting device passes through a first plane that (1) is substantially perpendicular to an axis of direct light emitted by said at least one light emitter, and that (2) extends through a portion of said light emitter.

2. A lighting device as recited in claim 1, wherein said at least one light emitter comprises at least one solid state lighting device.

3. A lighting device as recited in claim 2, wherein said at least one solid state lighting device comprises a light emitting diode.

4. A lighting device as recited in claim 2 wherein said at least one solid state lighting device comprises a plurality of light emitting diodes.

5. A lighting device as recited in claim 1, wherein said sensor is within a conical region bounded by lines which each define an angle of ten degrees or less relative to said axis of direct light emitted by said light emitter.

6. A lighting device as recited in claim 1, wherein said sensor is within a conical region bounded by lines which each define an angle of five degrees or less relative to said axis of direct light emitted by said light emitter.

7. A lighting device as recited in claim 1, wherein:
- said lighting device further comprises at least one power supply, and
- said sensor is between said light emitter and said power supply.

8. A lighting device as recited in claim 1, wherein said reflector comprises at least one opening, said sensor is opposite said opening with respect to said light emitter, such that when said light emitter is emitting light, a portion of light emitted by said light emitter passes through said opening to said sensor.

9. A lighting device as recited in claim 1, wherein said sensor is sensitive to visible light of all wavelengths.

10. A lighting device as recited in claim 1, wherein said sensor is sensitive to only some wavelengths of visible light.

11. A lighting device as recited in claim 1, wherein when said light emitter is emitting light, at least 90% of light emitted by said light emitter is reflected only once by said reflector.

12. A lighting device as recited in claim 1, wherein when said light emitter is emitting light, at least 10% of light emitted by said light emitter is reflected at least twice by said reflector.

13. A lighting device as recited in claim 1, wherein said lighting device comprises at least two reflectors, and when said light emitter is emitting light, at least 10% of light emitted by said light emitter is reflected by at least two of said reflectors.

14. A lighting device as recited in claim 1, wherein said lighting device comprises at least two reflectors, and when said light emitter is emitting light, at least 70% of light emitted by said light emitter is reflected by at least two of said reflectors.

15. A lighting device as recited in claim 14, wherein at least 50% of light emitted by said light emitter exits said lighting device in a direction which defines an angle of not greater than 90 degrees relative to said axis of direct light emitted by said light emitter.

16. A lighting device as recited in claim 1, wherein said reflector comprises at least one opening, and said sensor is positioned such that a portion of light emitted by said light emitter travels directly from said light emitter, through said opening and to said sensor, and substantially no ambient light passes through said opening and to said sensor.

17. A lighting device, comprising:
- at least one light emitter;
- at least one reflector, said reflector positioned to receive light from said light emitter and reflect said light to exit said lighting device; and
- at least one sensor, said sensor within a region which receives light from said light emitter reflected from said reflector when said light emitter is emitting light,
- wherein prior to exiting said lighting device, light that exits said lighting device passes through a first plane that (1) is substantially perpendicular to an axis of direct light emitted by said at least one light emitter, and that (2) extends through a portion of said light emitter.

18. A lighting device as recited in claim 17, wherein said sensor is directly next to said light emitter.

19. A lighting device as recited in claim 17, wherein at least 75% of said reflected light from said light emitter received by the sensor would not exit said lighting device if said sensor were not present.

20. A lighting device as recited in claim 1, wherein said sensor is on or within said curved region.

21. A lighting device as recited in claim 1, wherein a first volume is defined by said at least one reflector and a second plane, and said at least one light emitter is within said first volume.

* * * * *